Sept. 10, 1963     M. COMANOR ETAL     3,103,452

DELAYED-ACTIVATION BATTERY

Filed Feb. 24, 1960

MILTON COMANOR
CHARLES M. GOLD
INVENTORS

BY

AGENT

United States Patent Office 3,103,452
Patented Sept. 10, 1963

3,103,452
DELAYED-ACTIVATION BATTERY
Milton Comanor, New York, and Charles M. Gold, Franklin Square, N.Y., assignors to Yardney International Corp., New York, N.Y., a corporation of New York
Filed Feb. 24, 1960, Ser. No. 10,748
11 Claims. (Cl. 136—90)

Our present invention relates to reserve-type batteries of the type in which a plurality of dry-charged cells are activated by the introduction of a liquid electrolyte through a common manifold.

Delayed-activation batteries of this type have been found to experience self-discharge via inter-cell leakage paths constituted by the static electrolyte column which extends through the manifold to the supply reservoir.

It is an object of the present invention to suppress this type of self-discharge of delayed-activation batteries.

A more general object of our invention is to provide simple means for disrupting a leakage path for battery electrolytes and similar active liquors which extends through a narrow feeding duct for such liquors.

According to the invention, the disruption of inter-cell leakage paths via the electrolyte-distributing network or manifold of a reserve-type battery is effected by the presence, within the common channel of this network and/or its branches, of an agent (generally a metal or alloy) capable of reacting with the alkaline solution to form gas bubbles lodging in its passages after the flow of liquid has ceased.

The gassing agent may be in the form of an insert (for instance tubular) in the electrolyte passage or of a coating lining that passage. It should have limited solubility in the electrolyte so as not to interfere materially with normal activation by excessive gassing and in order to retain its identity throughout the intended period of storage and use which is to follow the activation step. In alkaline batteries activated by a solution of potassium hydroxide, for example, the agent may be aluminum or calcium; for lead-acid batteries, iron would be suitable. It is also possible to use a copper-gallium alloy, particularly where the manifold branches are made from copper, or sodium amalgam. Other materials, moderately active in the electrolyte and compatible with the electrode system used, will readily suggest themselves in any specific instances.

Contact between the gassing agent and the active liquor results in the evolution of hydrogen bubbles which interrupt the electrolyte thread to break the current-leakage circuits between the several cells of the battery after the same has been activated in the normal manner. As the electrolyte within the individual cells is consumed, fresh liquor from the reservoir passes slowly through the manifold toward the cells, driving the existing bubbles before it while giving rise to new bubbles at the locations where the gassing agent is present.

The above and other objects, features and advantages of our invention will become more readily apparent from the following description, reference being made to the accompanying drawing in which.

Figure 1:
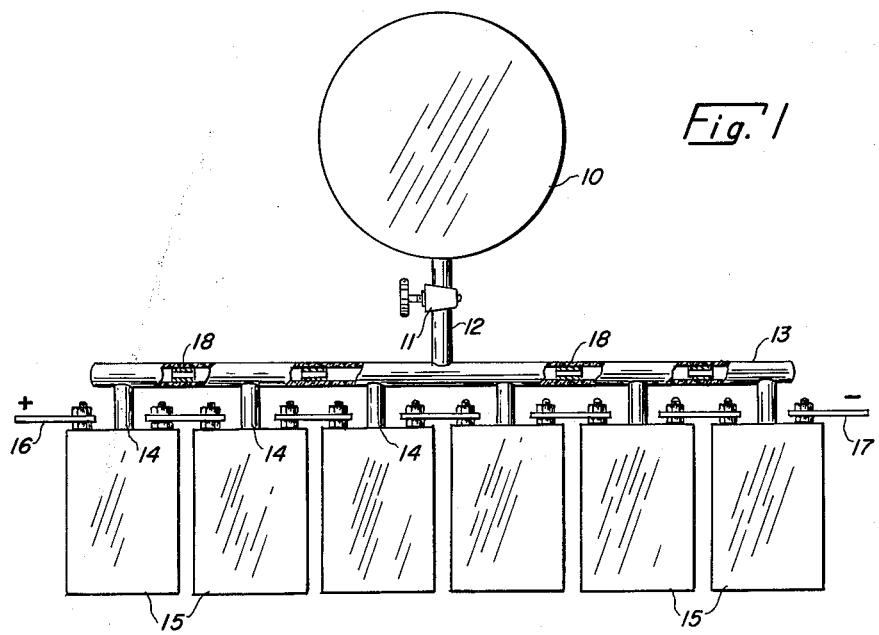
FIG. 1 is a somewhat schematic front-elevational view of a delayed-activation battery according to the invention.
Figures 2, 3:
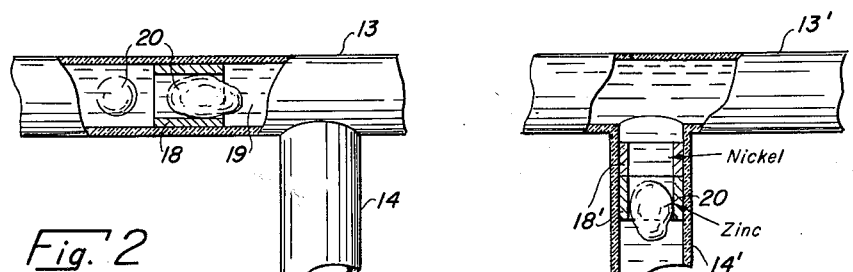
FIG. 2 is a detail view of a portion of the distributing manifold of the battery of FIG. 1, drawn to a larger scale.
FIG. 3 is a view similar to FIG. 2, illustrating a modification.

In FIGS. 1 and 2 we show an electrolyte reservoir 10 designed to deliver electrolyte under pressure connected via a supply tube 12 to a distributing manifold 13 which communicates with the series-connected cells 15 via risers 14. Cells 15 may be evacuated as shown, for example, by the Hinman Patent No. 2,886,621. An activation mechanism, schematically represented by a valve 11, serves to initiate the flow of electrolyte. The battery is provided with a positive terminal 16 and a negative terminal 17 which may be connected to a suitable load, not shown. Between successive cells 15 there is provided in manifold 13 a tubular insert 18 of a material adapted to cause the evolution of a gas to break current-leakage paths between cells via electrolyte contained in the risers 14 and the portion of manifold 13 linking the cells. The electrolyte 19 may be a concentrated solution of potassium hydroxide while the inserts 18 may be of aluminum. The interaction of this metal with the liquor 19 gives rise to one or more hydrogen bubbles 20 (shown in FIG. 2) disrupting the current flow through the manifold.

It will also be apparent that similar results may be achieved by positioning inserts 18' within the risers 14' as shown in FIG. 3. In the presence of electrolyte, gaseous bubbles 20 form and tend to lodge either at the insert or at the junction of the riser 14' with the manifold 13'.

In a system in which several cells 15 as shown in FIG. 1 are connected in parallel to a common electrolyte reservoir 10, it may also be advantageous to position a gas-producing insert in each supply tube 12 to prevent a discharge path from developing through the reservoir.

We have found that a conventional battery of the general type shown in FIG. 1 self-discharged in about one hour after activation when not equipped with the afore-described inserts, while with these inserts the battery discharged normally through an external load after standing for about 20 hours in its activated condition without noticeable self-discharge.

It will be apparent that the manifold 13 could also be positioned underneath the cells 15, with the electrolyte entering the cell casings from below via the risers 14 as, for example, shown in the Murphy Patent No. 2,529,511.

The insert according to this invention may also be split into two portions of different metals forming a gassing couple in the electrolyte. This has been illustrated in FIG. 3 where the tube 18' is shown split into two parts of zinc and nickel, respectively. Other ferrous metals, such as iron or cobalt, could be substituted for nickel.

The above described invention permits of application to many electrochemical systems and may be modified in ways believed readily apparent to persons skilled in the art and intended to be included within the spirit and scope of the invention, except as further limited by the appended claims.

We claim:
1. In a reserve-type battery having a plurality of cells connected via a common distributing conduit network to an electrolyte containing reservoir, the improvement which comprises a reactive agent positioned in inter-cell passages of said network, said agent being soluble in the electrolyte and capable of producing gas bubbles upon dissolving therein, thereby disrupting a path for electric leakage currents between said cells.

2. The improvement according to claim 1 wherein said agent lines a portion of the wall of said passages.

3. The improvement according to claim 1 wherein said agent is in the form of at least one tubular insert.

4. The improvement according to claim 3 wherein said electrolyte is alkaline, said insert consisting of aluminum.

5. In a reserve-type battery having a plurality of cells connected via a common distributing conduit network to an electrolyte containing reservoir, said network including a manifold with a common channel and a plurality of branches extending from said channel toward said cells, the improvement which comprises a reactive agent positioned in said manifold between said cells, said agent being soluble in the electrolyte and capable of producing gas bubbles upon dissolving therein, thereby disrupting a path for electric leakage currents between said cells.

6. The battery according to claim 5 wherein said agent comprises a plurality of inserts distributed substantially throughout said manifold.

7. The battery according to claim 6 wherein said inserts are positioned in said channel between successive junctions with said branches.

8. The battery according to claim 6 wherein said inserts are positioned in said branches.

9. The battery according to claim 6 wherein said inserts are subdivided into two portions of different metals forming a gassing couple in said electrolyte.

10. The battery according to claim 9 wherein said metals are zinc and a ferrous metal.

11. A deferred action battery comprising a reservoir of liquid electrolyte, a plurality of battery cells, a manifold connecting said reservoir and said plurality of battery cells and means for feeding said electrolyte to said manifold, said manifold comprising a common conduit and series of cell conduits each connecting said common conduit with a battery cell, a plurality of hollow tubular inserts in said common conduit, each of said tubular inserts being positioned between adjacent cell conduits, said tubular insert being made of a material selected from the group consisting of aluminum, and iron, said material being soluble in said liquid electrolyte and reacting therewith to produce gas bubbles which disrupt the path of electric leakage currents between said battery cells.

References Cited in the file of this patent

UNITED STATES PATENTS

| | | |
|---|---|---|
| 2,594,879 | Davis | Apr. 29, 1952 |
| 2,829,187 | McDonald | Apr. 1, 1958 |
| 2,905,741 | Smith et al. | Sept. 22, 1959 |